United States Patent
Harrell

(10) Patent No.: US 7,421,820 B2
(45) Date of Patent: Sep. 9, 2008

(54) JIG FISH LURE

(76) Inventor: Eric A. Harrell, 108 Fox La., Pickens, SC (US) 29671

( * ) Notice: Subject to any disclaimer, the term of this patent is extended or adjusted under 35 U.S.C. 154(b) by 82 days.

(21) Appl. No.: 11/374,992

(22) Filed: Mar. 15, 2006

(65) Prior Publication Data

US 2006/0156611 A1   Jul. 20, 2006

Related U.S. Application Data

(63) Continuation-in-part of application No. 11/115,617, filed on Apr. 27, 2005, now abandoned, which is a continuation-in-part of application No. 10/637,786, filed on Aug. 8, 2003, now abandoned.

(60) Provisional application No. 60/445,887, filed on Feb. 6, 2003.

(51) Int. Cl.
 *A01K 85/00* (2006.01)
(52) U.S. Cl. .................................................. 43/42.39
(58) Field of Classification Search ............... 43/42.39, 43/42.37, 42.36, 42.08, 42.05
 See application file for complete search history.

(56) References Cited

U.S. PATENT DOCUMENTS

| | | | | |
|---|---|---|---|---|
| 1,333,318 A | * | 3/1920 | Kijima | 43/42.13 |
| 1,434,204 A | * | 10/1922 | Grounsell | 43/42.05 |
| 1,746,753 A | | 2/1930 | Whitney | |
| 1,848,704 A | * | 3/1932 | Farley | 43/42.06 |
| 2,389,883 A | | 11/1945 | Worden | |
| 2,490,507 A | | 12/1949 | Brown | |
| 2,598,360 A | | 5/1952 | Cummins | |
| 2,625,767 A | * | 1/1953 | Pokras | 43/42.05 |
| 2,829,462 A | * | 4/1958 | Stokes | 43/42.48 |
| 2,892,281 A | | 6/1959 | Schilling | |
| 3,269,050 A | * | 8/1966 | Garwood | 43/42.33 |
| 3,429,066 A | | 2/1969 | McClellan | |
| 3,885,339 A | * | 5/1975 | Herkner | 43/42.05 |
| 3,914,895 A | | 10/1975 | Mize | |
| 3,955,304 A | | 5/1976 | Reid | |
| 4,163,337 A | * | 8/1979 | Kress | 43/42.5 |
| 4,164,826 A | | 8/1979 | Metzler et al. | |
| 4,803,798 A | * | 2/1989 | Hannah | 43/43.13 |
| 5,090,151 A | | 2/1992 | Salminen | |
| 5,113,608 A | | 5/1992 | Hook | |
| 5,175,955 A | | 1/1993 | Wilson et al. | |
| 5,261,182 A | | 11/1993 | Link | |
| 5,335,441 A | | 8/1994 | Blackwell | |
| 5,339,559 A | * | 8/1994 | Strobbe | 43/42.37 |
| 5,551,185 A | * | 9/1996 | Reed | 43/42.39 |

(Continued)

*Primary Examiner*—Kurt Rowan
(74) *Attorney, Agent, or Firm*—J. Bennett Mullinax, LLC

(57) ABSTRACT

The jig fish lure has a jig head, a neck extending from the jig head, and a fishhook having a portion of the shank embedded in the jig head and neck. The jig head has an upper portion and a lower portion. A recess having orthogonal walls extending horizontally and vertically is defined in the lower portion, defining a ledge. A notch is defined in the upper portion extending into and bifurcating the ledge, the notch defining a passage. A bore is defined through the upper portion extending from the crown of the jig head to the top of the notch. The eye of the fishhook extends from the lower portion of the jig head beneath the ledge. A fishing line can be threaded through the bore and the notch, looped through the eye, and secured by a knot, which lies protected within the notch.

10 Claims, 4 Drawing Sheets

U.S. PATENT DOCUMENTS

| | | | |
|---|---|---|---|
| 5,832,655 A | * 11/1998 | Crumrine | 43/42.39 |
| 5,899,015 A | * 5/1999 | Link | 43/42.39 |
| 6,813,857 B2 | 11/2004 | Payer | |
| 2003/0024150 A1 | 2/2003 | Hawkins | |
| 2004/0154212 A1 | 8/2004 | Harrell | |
| 2005/0183323 A1 | 8/2005 | Harrell | |

* cited by examiner

JIG FISH LURE

CROSS-REFERENCE TO RELATED APPLICATIONS

This is a continuation-in-part of my prior application Ser. No. 11/115,617, filed Apr. 27, 2005 now abandoned, which is a continuation-in-part of U.S. application Ser. No. 10/637,786, filed Aug. 8, 2003, now abandoned, which claimed the benefit of U.S. provisional patent application Ser. No. 60/445,887, filed Feb. 6, 2003.

BACKGROUND OF THE INVENTION

1. Field of the Invention

The present invention relates to a fishing lures, and particularly to a jig fish lure that is less susceptible to being caught on debris.

2. Description of the Related Art

The construction of a fishing jig is well known. Jigs have a hook with a weighted jig head, usually made from lead, disposed on the shank adjacent the eye. The vast majority of jig lures are made with a special hook, which usually has a 90° bend in the shank, although some jig hooks have a 45° bend in the shank, so that when the jig is made, the hook is placed in a mold with the eye in a recess outside of the mold cavity. In this manner, the eye of the hook normally projects from the head, the eye being coplanar with the hook, rather than being normal to the hook. A fishing line is tied around the eye. The jig is normally used by casting the lure into the body of water, the weighted jig head causing the lure to sink to the bottom, and the fisherman yanks or "jigs" the line to attract fish to the lure. In virtually all jig lures with which the inventor is familiar, the eye of the hook extends either from the top of the jig head, or from the side of the jig head, i.e., either above the center of gravity of the jig head or even with the center of gravity.

A problem that is sometimes encountered with this construction occurs when there are weeds or rocks on the bottom of the stream, pond, or other body of water. Since the eye extends from the jig head, the knot tied around the eye is susceptible to being snagged on the weeds, rocks, wood, and other obstructions that may be encountered on the bottom. While weed guards offer a partial solution to this problem, nevertheless, there is still a need for an improved jig head construction that leaves the knot securing the jig lure to the fishing line less exposed.

Thus, a jig fish lure solving the aforementioned problems is desired.

SUMMARY OF THE INVENTION

The jig fish lure has a jig head, a neck extending from the jig head, and a fishhook having a portion of the shank embedded in the jig head and neck. The jig head has an upper portion and a lower portion. A recess having orthogonal walls extending horizontally and vertically is defined in the lower portion, defining a ledge. A notch is defined in the upper portion extending into and bifurcating the ledge, the notch defining a passage. A bore is defined through the upper portion extending from the crown of the jig head to the top of the notch. The eye of the fishhook extends from the lower portion of the jig head beneath the ledge. A fishing line can be threaded through the bore and the notch, looped through the eye, and secured by a knot, which lies protected within the notch, in order to attach the lure to the fishing rod.

The jig head is made from a heavy ballast, preferably lead, so that the hook will sink when cast into a body of water. The eye is disposed below the center of gravity of the jig head. This permits the knot to be shielded or sheltered within the notch defined in the central or upper portion of the jig head, thereby preventing the knot from becoming snagged on weeds, rocks, and other underwater projections.

The jig head may be painted and provided with a weed guard extending from the opposite side of the jig head from the eye of the fishhook. The lure may further be dressed with a skirt of other devices for attracting fish to the lure. The jig fish lure is attached to a rod and cast into a stream, pond, river, or other fishing location. The weight of the jig head causes the lure to sink to the bottom. The fisherman then pulls or jigs on the fishing line to attract fish to the lure.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
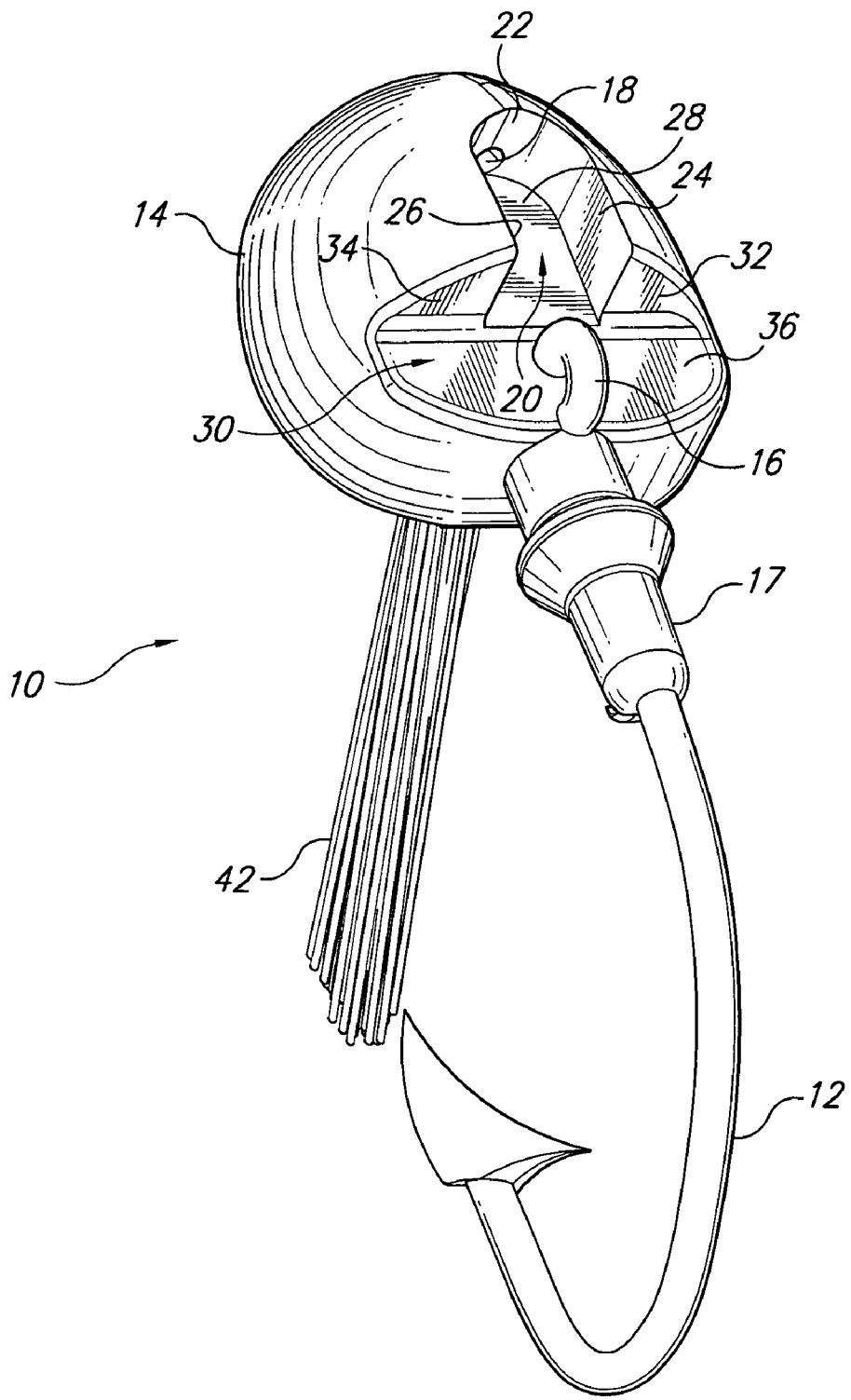
FIG. 1 is a front-bottom perspective view of a jig fish lure according to the present invention.
Figure 2:
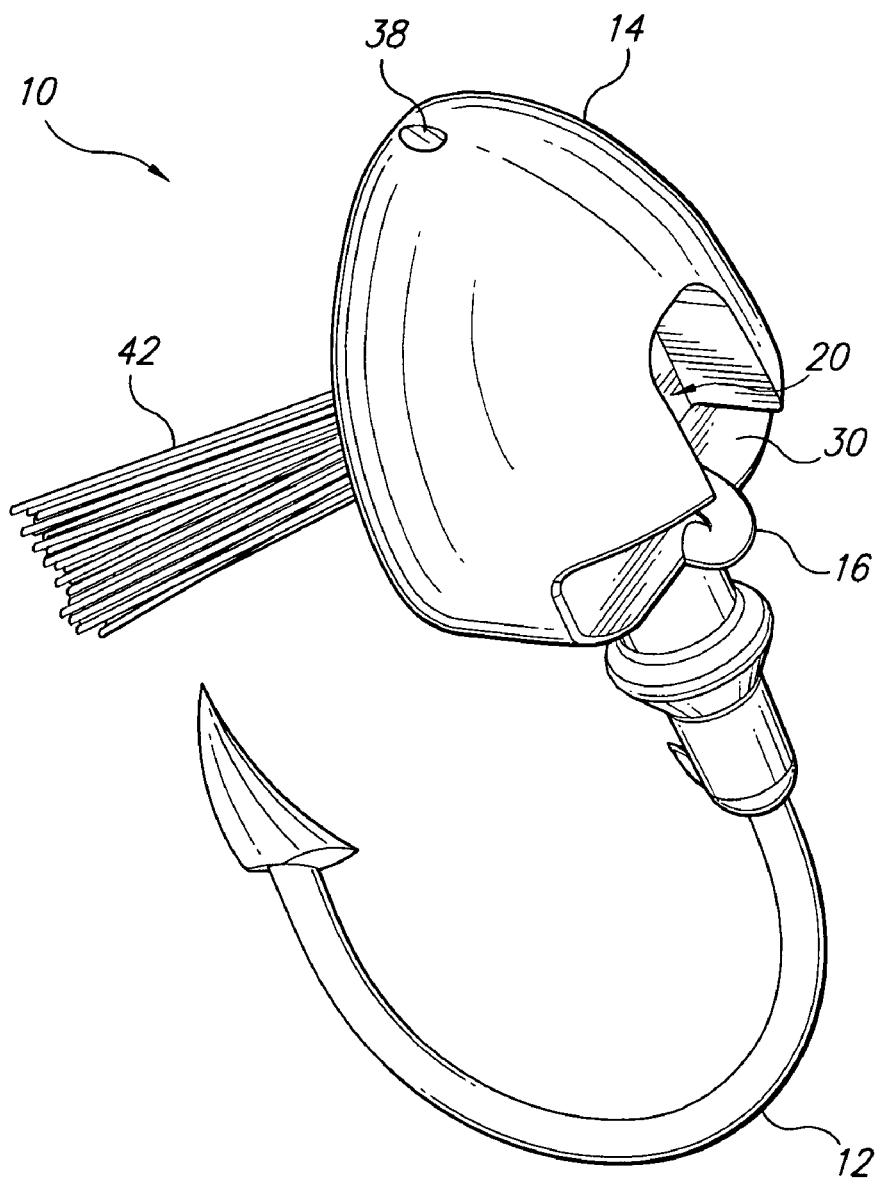
FIG. 2 is a top-left perspective view of the jig fish lure according to the present invention.
Figure 3:
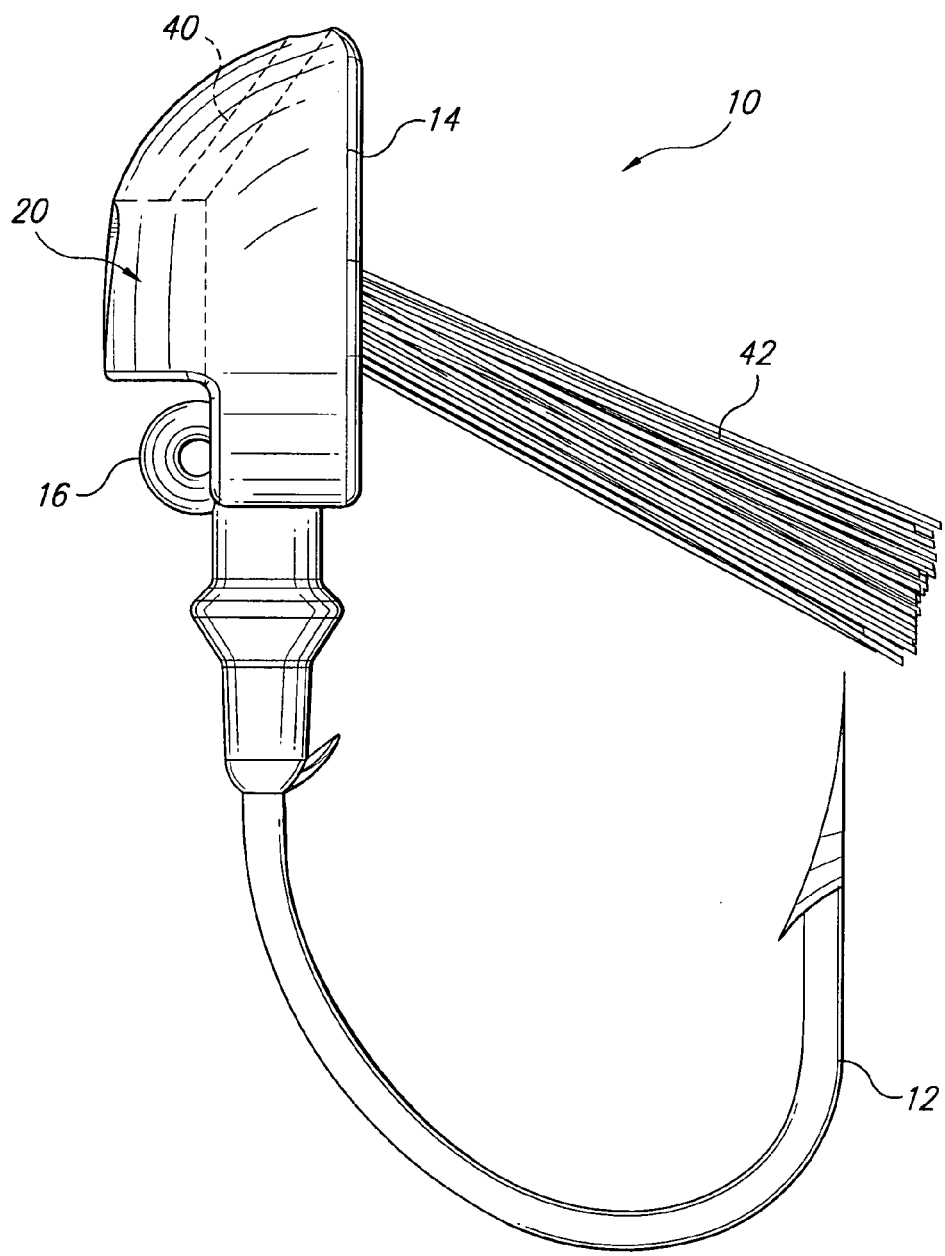
FIG. 3 is a side elevational view of the jig fish lure according to the present invention.
Figure 4:
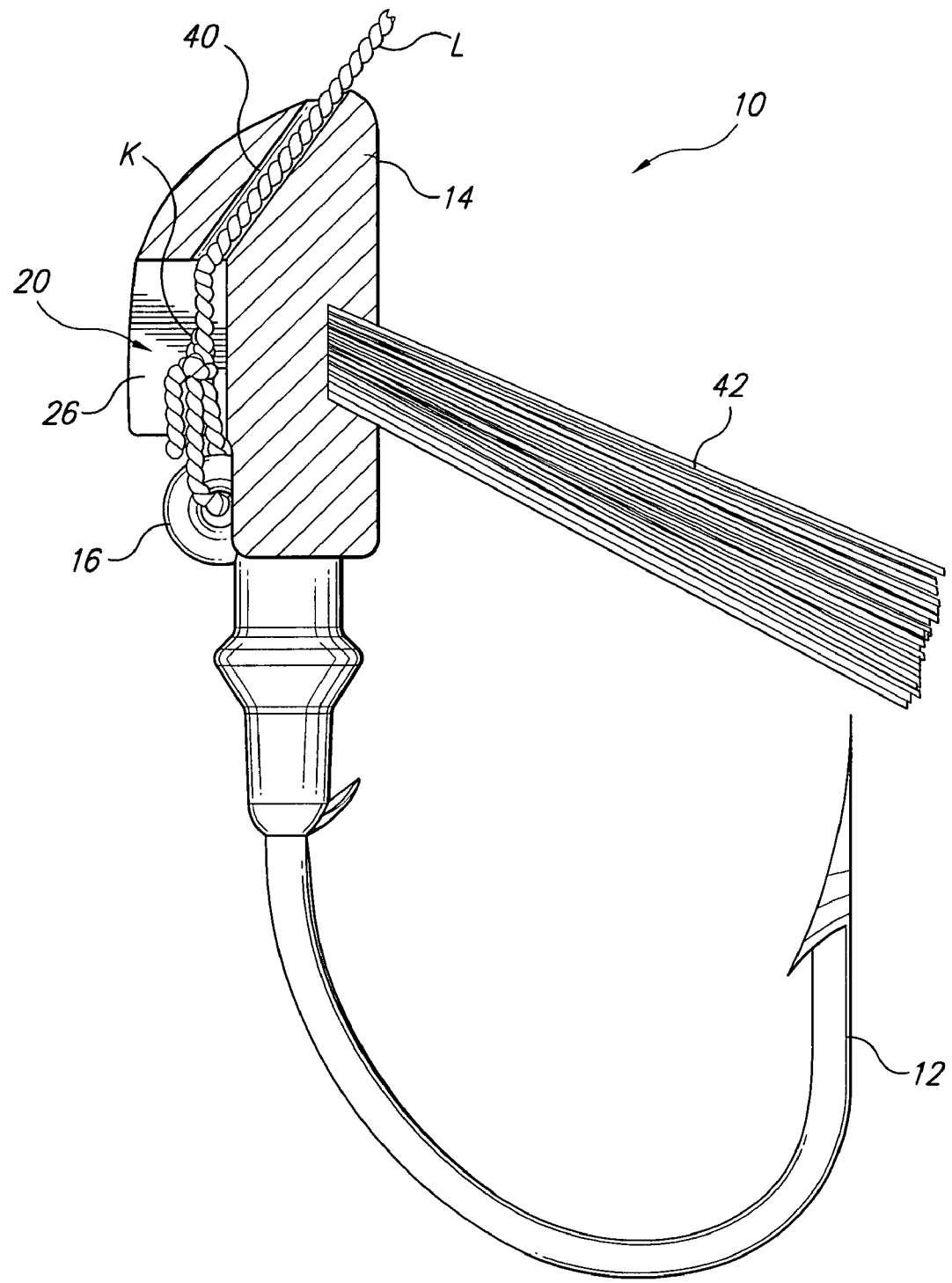
FIG. 4 is an environmental side elevational view similar to FIG. 3 with the jig head in section to show attachment of a fishing line to the lure.

The present invention, as shown in FIGS. 1-4, is a jig fish lure 10, often referred to herein simply as the jig, having a fishhook 12, a jig head 14, and a neck 17. A notch in a central portion of the jig head 14 defines a passage 20. The passage 20 is defined by an inner upper surface 22, inner right and left surfaces 24 and 26 extending from the inner upper surface 22 parallel to an axis running from an upper portion to a lower portion of the jig head 14, and an inner back passage surface 28.

The fishhook 12 includes an eye 16 having a hole for receiving a fishing line. The eye 16 is coplanar with the barb of the hook 12 and is disposed below the passage 20 in an eye recess 30. The eye recess 30 is defined in the lower portion of the jig head 14 by orthogonal walls extending generally horizontally and vertically, defining a ledge. The notch extends into the ledge, bifurcating the ledge to define a right ledge 32, a left ledge 34, and an inner back recess surface 36. The two ledges 32 and 34 are coplanar, in a plane perpendicular to the planes in which the inner right and left surfaces 24 and 26 are located. The gap formed between the two ledges 32 and 34 by the notch allows a fishing line L to pass from the passage 20 to the recess 30.

The upper portion of the shank of the fishhook 12 is bent at an angle of about 90°. The bend and the upper portion of the shank are embedded in the lower portion of the jig head and encased in the neck 17, which extends from the lower portion of the jig head 14. The neck 17 and the jig head 14 of the lure 10 are molded over the shank of the hook 12 using a centrifugal molding process. Inserts are placed in the negative areas, i.e. the passage 20, the eye recess 30, and the bore 40 during the molding process.

A bore 40 for the passage of a fishing line is defined from the top of the jig head through the upper portion to the inner upper surface 22 of the notch. The inner upper surface 22 defines the inner opening 18 of the line bore 40 (best seen in FIGS. 3 and 4). A fishing line L (FIG. 4) is passed through the bore 40 through outer opening 38 defined in the upper portion of the outer surface of the jig head 14. The fishing line L extends through the passage 20 and into the recess 30. The line L is tied around the eye 16, and the resulting knot K is placed in the passage 20 for storage, where it is protected from rocks, weeds, and other obstacles. Because the eye 16 is below the ledges 32 and 34, the eye 16 (and the portion of the line encircling it) is also protected from weeds and rocks. The jig 10 may also include a weed guards 42 extending from the jig head 14 opposite the notch.

Because the jig head 14 and neck 17 are made of lead, the jig is relatively heavy at its upper portion. The center of gravity of the jig 10 is located significantly above the ledges 32 and 34 and the eye 16. When the jig 10 is used and put in a body of water, the jig 10 falls in the water jig head 14 first and the eye 16 is again protected.

It is to be understood that the present invention is not limited to the embodiment described above, but encompasses any and all embodiments within the scope of the following claims.

I claim:

1. A jig fish lure, comprising:
   (a) a jig head having an upper portion having a bore defined therein, a central portion defining a passage, and a lower portion defining an eye recess, wherein the eye recess has an inner back recess surface and a left ledge and a right ledge, wherein the inner back recess surface and the left ledge and the right ledge are planar, wherein the left ledge and the right ledge are perpendicular to the inner back recess surface, and wherein the left ledge and the right ledge and the inner back recess surface form a portion of the exterior surface of the jig head; and
   (b) a fishhook extending from the lower portion of the jig head, the fishhook having an eye defining an opening for attaching a fishing line, the eye being mounted in the eye recess so that the eye is protected by the jig head;
   whereby, when a fishing line is passed through the bore and the passage, and a knot is tied around the eye, the knot is stored in the passage.

2. The jig fish lure of claim 1, wherein the left ledge and the right ledge are bifurcated by the passage, the eye of said fishhook being disposed under the left ledge and right ledge.

3. The jig fish lure of claim 2, wherein the eye is mounted in alignment with the passage.

4. The jig fish lure of claim 1, further including a weed guard extending from said jig head opposite the passage.

5. The jig fish lure of claim 1, wherein said jig head has a center of gravity, the eye being disposed below the center of gravity of said jig head.

6. The jig fish lure according to claim 1, further comprising a substantially cylindrical neck extending from the lower portion of said jig head, a portion of a shank of said fishhook adjacent the eye being embedded in the lower portion of the jig head and encased in the neck.

7. A jig fish lure, comprising:
   (a) a jig head having an upper portion having a bore defined therein, a central portion defining a passage, and a lower portion defining an eye recess, the jig head having a center of gravity,
   wherein the passage has an inner back passage surface and an inner right surface and an inner left surface, wherein the inner back passage surface and the inner right surface and the inner left surface are planar, wherein the inner back passage surface is perpendicular to the inner right surface and the inner left surface, and wherein the inner back passage surface and the inner right surface and the inner left surface form a portion of the exterior surface of the jig head,
   wherein the eye recess has an inner back recess surface and a left ledge and a right ledge, wherein the inner back recess surface and the left ledge and the right ledge are planar, wherein the left ledge and the right ledge are perpendicular to the inner back recess surface, and wherein the left ledge and the right ledge and the inner back recess surface form a portion of the exterior surface of the jig head,
   wherein the inner left surface is perpendicular to the left ledge, and wherein the inner right surface is perpendicular to the right ledge; and
   (b) a fishhook extending from the lower portion of the jig head, the fishhook having an eye defining an opening for attaching a fishing line, the eye being mounted in the eye recess so that the eye is protected by the jig head, the eye being disposed below the center of gravity of the jig head, wherein the position of the fishhook does not change with respect to the jig head;
   whereby, when a fishing line is passed through the bore and the passage, and a knot is tied around the eye, the knot is stored in the passage, wherein the bore is angled with respect to the passage such that the fishing line is angled upon extending through the bore and the passage.

8. The jig fish lure of claim 7, wherein the left ledge and the right ledge are bifurcated by the passage, the eye of said fishhook being disposed under the left ledge and right ledge.

9. The jig fish lure of claim 8, wherein the eye is mounted in alignment with the passage.

10. The jig fish lure of claim 7, further including a weed guard extending from said jig head opposite the passage.

* * * * *

UNITED STATES PATENT AND TRADEMARK OFFICE
CERTIFICATE OF CORRECTION

| | | |
|---|---|---|
| PATENT NO. | : 7,421,820 B2 | Page 1 of 1 |
| APPLICATION NO. | : 11/374992 | |
| DATED | : September 9, 2008 | |
| INVENTOR(S) | : Eric A. Harrell | |

It is certified that error appears in the above-identified patent and that said Letters Patent is hereby corrected as shown below:

In claim 1 at col. 3 lines 42 and 43, the phrase "the eye recess" should read --and perpendicular to said inner back recess surface, whereby part of said eye is embedded in said lower portion--.

Signed and Sealed this

Sixteenth Day of December, 2008

JON W. DUDAS
*Director of the United States Patent and Trademark Office*